US009829936B1

United States Patent
Rivera et al.

(10) Patent No.: US 9,829,936 B1
(45) Date of Patent: Nov. 28, 2017

(54) POWER SOURCE CONFIGURATION TO FIT A MEMORY SLOT

(71) Applicant: Hewlett Packard Enterprise Development LP, Houston, TX (US)

(72) Inventors: Mark Isagani Bello Rivera, Cypress, TX (US); David P. Mohr, Spring, TX (US); Hai Ngoc Nguyen, Spring, TX (US); Daniel Humphrey, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/168,693

(22) Filed: May 31, 2016

(51) Int. Cl.
*G06F 1/18* (2006.01)
*H01R 12/70* (2011.01)
*H01R 13/66* (2006.01)

(52) U.S. Cl.
CPC ............ *G06F 1/185* (2013.01); *G06F 1/189* (2013.01); *H01R 12/7088* (2013.01); *H01R 13/6675* (2013.01)

(58) Field of Classification Search
CPC ..... G06F 1/185; G06F 1/189; H01R 13/6675; H01R 12/7088
USPC ....................................... 361/679.31–679.32
See application file for complete search history.

(56) References Cited

U.S. PATENT DOCUMENTS

| | | | | |
|---|---|---|---|---|
| 2002/0058444 | A1* | 5/2002 | Sabotta | G06F 13/4022 439/692 |
| 2008/0101051 | A1* | 5/2008 | Middleton | G06F 1/183 361/796 |
| 2009/0231798 | A1* | 9/2009 | Skinner | G06F 1/185 361/679.31 |
| 2009/0279243 | A1* | 11/2009 | Amidi | G11C 5/04 361/679.31 |
| 2011/0080700 | A1* | 4/2011 | Bland | G06F 1/20 361/679.5 |
| 2011/0235271 | A1* | 9/2011 | Budai | G06F 1/185 361/692 |
| 2011/0286175 | A1* | 11/2011 | Iyengar | G06F 1/20 361/679.47 |
| 2013/0036263 | A1* | 2/2013 | Liu | G06F 11/1441 711/105 |
| 2013/0070410 | A1* | 3/2013 | Chen | G06F 1/185 361/679.31 |
| 2013/0070412 | A1* | 3/2013 | Ge | G06F 1/185 361/679.32 |
| 2013/0088843 | A1* | 4/2013 | Cong | G06F 1/185 361/785 |
| 2013/0148457 | A1* | 6/2013 | Sweere | G06F 12/0866 365/229 |
| 2013/0194745 | A1* | 8/2013 | Meijer | G06F 1/20 361/679.47 |

FOREIGN PATENT DOCUMENTS

WO   WO-2016048281   3/2016

* cited by examiner

*Primary Examiner* — Adrian S Wilson
*Assistant Examiner* — Abhishek Rathod
(74) *Attorney, Agent, or Firm* — Hewlett Packard Enterprise Patent Department

(57) ABSTRACT

Various examples herein disclose a system comprising a power source, multiple cards, and a power connector. The power source is mounted on multiple cards. The multiple cards each include an edge configured to fit into a memory slot. The power connector is coupled to the power source and located on a side of the multiple cards other than the edge.

17 Claims, 6 Drawing Sheets

POWER SOURCE CONFIGURATION TO FIT A MEMORY SLOT

BACKGROUND

As global demand for data exchange has grown, so does a size and load placed on a server. As such, servers generate exponentially more power thus producing more heat.

BRIEF DESCRIPTION OF THE DRAWINGS

In the accompanying drawings, like numerals refer to like components or blocks. The following detailed description references the drawings, wherein.

DETAILED DESCRIPTION

In a typical server, a power source is placed in the rear of the server. The power source is cooled by circulating air using a serial heating approach in which cool air is routed in a front-to-rear cooling process. In the serial heating approach, cool air is routed from the front electrical components to the rear components, such as the power source; however, the serial heating approach has its limitations as air heated by the front electrical components may be too hot to adequately cool the rear components. This heating approach produces a pre-heated effect to downstream electrical components and power sources.

Additionally, memory components may be costly and as such many server configurations may intentionally leave the memory slots empty. These empty memory slots are located upstream in the airflow and can receive generous airflow which is much cooler than what the power source may receive in the rear of the server. Moreover, the memory slots may remain empty throughout the server's lifetime. These empty memory slots provide an inefficient utilization of space and cooling.

The present disclosure provides a system among other examples to repurpose the empty memory slots for a power source. The system includes the power source as mounted on multiple cards. The multiple cards each include an edge which is configured to fit into a memory slot. The system also includes a power connector located on a side of the multiple cards other than the edges which are configured to fit the memory slots. Positioning the mounted power source into the existing memory slots may provide additional power source capability to increase the overall load to the server. Alternatively, positioning the mounted power source into the existing memory slots provides an additional option to relocate the power source from the rear of the server.

Additionally, repurposing the empty memory slots provides a more efficient mechanism of providing a cooler airflow to the power source. Operating at lower ambient temperatures, increases the overall lifetime and reliability of the power source and thus the server.

The following detailed description refers to the accompanied figures. Wherever possible, the same reference numbers are used in the figures and the following description to refer to the same or similar parts. It is to be expressly understood, however, that the figures are for the purpose of illustration and description only. While several examples are described throughout, modification, adaptions, and other implementations are possible. Accordingly, the following detailed description is not meant to limit the disclosed examples, rather it is meant to provide proper scope of the disclosed examples and may be defined by the appended claims.

Figure 1:
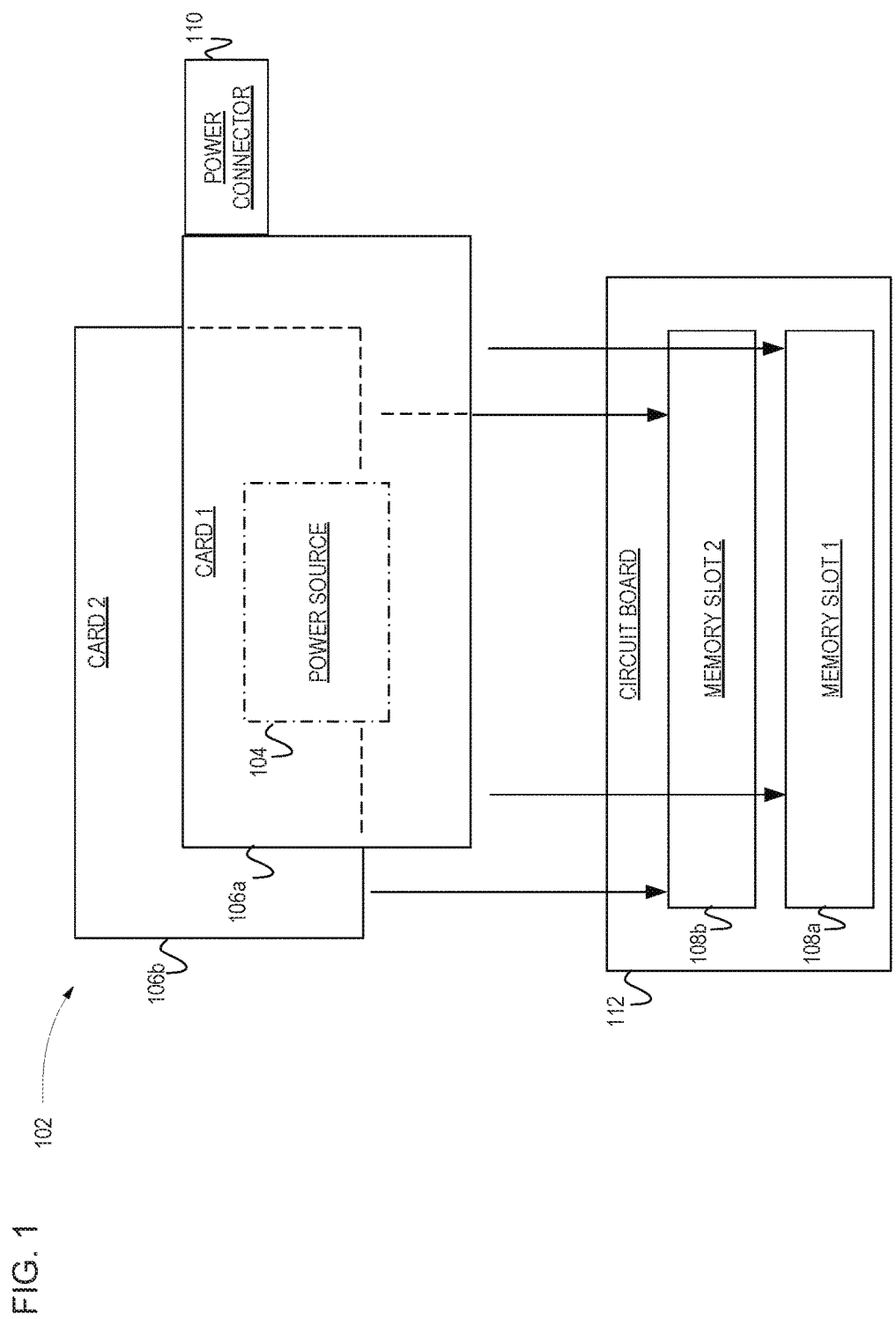
FIG. 1 illustrates an example system including a power source mounted on multiple cards, the multiple cards each include an edge configured to fit into a memory slot in accordance with the present disclosure.

FIG. 1 illustrates an example system 102 including power source 104 mounted between multiple cards 106a-106b. An edge of each card 106a-106b is configured to fit into multiple memory slots 108a-108b as indicated with the arrows. Multiple memory slots 108a-108b are positioned on circuit board 112. Power connector 110 is coupled to power source 104 and is located on a side of multiple cards 106a-106b other than edges configured to fit multiple memory slots 108a-108b. The term multiple cards 106a-106b and multiple memory sockets 108a-108b as discussed herein is to represent more than one card and socket, respectively. For clarification purposes, the term multiple cards and multiple memory sockets may be used interchangeably herein with terms cards and sockets, accordingly. FIG. 1 represents a server in a data center for data exchange, computation, storage, etc. As such, implementations of the server may include, a database server, mail server, file server, domain name system (DNS) server, print server, web server, game server, application server, cartridge server, blade server, catalog server, communication server, home server, media server, proxy server, or other type of computing device capable of data exchange.

Power source 104 may include an electronic device capable of providing functionality related to power of the server. Examples of the functionalities may include supplying electrical power, regulating power, monitoring power, converting the power, etc. As such, power source 104 may include electrical components (not illustrated) to provide such functionality. Power, as used herein, may include current, voltage, electrical charge, watts, or other type of energy provided from power source 104. Power source 104 is illustrated with hidden lines to represent placement of power source 104 on cards 106a-106b. As such, power source 104 may be mounted on cards 106a-106b prior to placement into memory slots 108a-108b. In one implementation, power source 104 may include a battery module and/or power converter to increase power and convert power to the system. This implementation may be discussed in later details. Implementations of power source 104 include a direct current (DC)-to-DC converter, power supply, power factor correction (PFC) module, battery, regulator module, power supply stage, alternating current (AC)-to-DC converter, transformer, etc.

Cards 106a-106b may include rigid structure which provides the framework in which to mount power source 104. Cards 106a-106b each include an edge that may be shaped to affix or fasten power source 104 to memory slots 108a-108b. In this implementation, the edge corresponding to each card 106a-106b may include a notch or other mechanism to guide and affix the card to each of the memory slots 108a-108b. For example, a notch placed near the bottom of each card 106a-106b to secure power source 104 to memory slots 108a-108b through a latching mechanism of each memory slot 108a-108b. In a further implementation, the edge corresponding to each card 106a-106b is without pins or contacts to electrically connect power source 104 to memory slots 108a-108b. Rather power connector 110 provides the capability to connect power source 104 to the server. As illustrated, the edge of cards 106a-106b may be located on the bottom of each card 106a-106b which allows each card 106a-106b mounted with power source 104 to sit in an upright position within memory sockets 108a-108b. As illustrated, memory slot 108a corresponds to receiving the edge of card 106a, while memory slot 108b receives the edge of card 106b.

Memory slots 108a-108b may include an area on circuit board 112 capable of receiving memory components. Memory slots 108a-108b are located in the area on circuit board 112 which is upstream in the airflow. This location means memory slots 108a-108b are located toward the central or front end of circuit board 112. Memory slots 108a-108b may further include latching mechanisms or rails (not illustrated) in which facilitate affixing cards 106a-106b. Memory slots 108a-108b serve as mechanism to support power source 104 rather than to provide electrical connections. In implementations, memory slots 108a-108b may include dual in-line memory (DIMM) sockets and/or double data rate fourth-generation synchronous random-access memory (DDR4), module sockets, or combination thereof.

Power connector 110 is coupled to power source 104 via electrical connections (not illustrated). Power connector 110 includes the electrical contacts and/or pins in which power signals are relayed to and from system 102. In this manner, power connector 110 provides the electrical connections from power source 104 to the rest of the server. Power connector 110 is located in system 102 on cards 106a-106b and is positioned along a side of cards 106a-106b other than the edge of each card 106a-106b. For example, assume the edge of each card 106a-106b is configured at the bottom to affix cards 106a-106b to memory slots 108a-108b. In this example, power connector 110 may be connected to cards 106a-106b along either of other sides (top, left, right). Although FIG. 1 illustrates power connector 110 as coupled to the right hand slide of card 106a, this was done for illustration purposes and not for limiting implementations of the present disclosure. For example, power connector 110 may be coupled to both cards 106a-106b on any of the three sides other than the edges of the cards 106a-106b. Implementations of power connector 110 include an AC connector, DC connector, or other type of power capable connecting device.

Circuit board 112 is printed circuit board which mechanically supports and electrically connects memory slots 108a-108b using conductive tracks, pads, or other features. These electrical connections may be created through an etching of a copper sheet which is laminated onto a non-conductive substrate. Additionally, circuit board 112 may include additional electrical components (not illustrated) for operation of the server. For example, circuit board 112 may include a processor for managing operations of the server.

Figure 2:
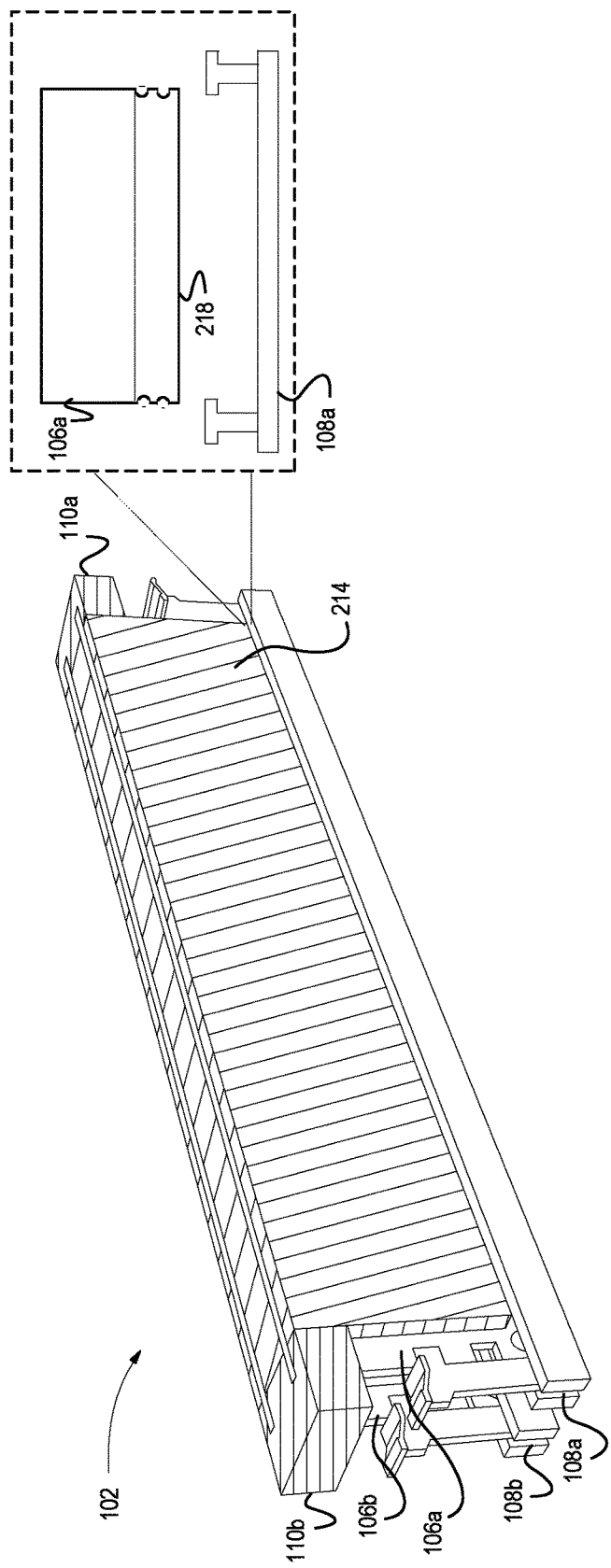
FIG. 2 illustrates an example system including a power source mounted on multiple cards and configured to fit into multiple memory slots, the system also includes multiple power connectors coupled to the power source in accordance with the present disclosure.

FIG. 2 illustrates a side perspective of example system 102 as affixed to memory slots 108a-108b. System 102 includes a power source (not illustrated) mounted on cards 106a-106b along with a casing 214 to house the mounted power source. In another implementation, the power source may be mounted between cards 106a-106b. Casing 214 may include cover or shell which encloses the power source mounted on cards 106a-106b. The cards 106a-106b each include an individual edge which are configured to fit into memory slots 108a-108b. Additionally, card 106a is shown with edge 218 to illustrate how edge 218 may fit into corresponding memory slot 108a. System 102 also includes multiple power connectors 110a-110b each coupled to the mounted power source via electrical connections. Power connectors 110a-110b are each positioned on a different side of the cards 106a-106b, other than the edges which are installed within memory slots 108a-108b. Power connectors 110 are located on a side of cards 106a-106b other than the edges which are installed in memory slots 108a-108b. Memory slots 108a-108b include additional latching mechanisms which are positioned upright from slots 108a-108b. These latching mechanisms fasten or affix cards 106a-106b with the power source into slots 108a-108b. In this implementation, the latching mechanisms provide a mechanical feature to stabilize and support the power source mounted cards 106a-106b.

Card 106a is illustrated with edge 218 configured to fit corresponding slot 108a. Edge 218 may be configured with notches to fit into corresponding memory slot 108a. Although FIG. 2 illustrates edge 218 with multiple notches, this was done for illustration purposes as edge 218 may include a single notch or additional notches (not illustrated). Additionally, edge 218 may be configured with other mounting mechanism configured to fit into memory slot 108a. In a further implementation, cards 106a-106b may each be configured with a different mounting mechanism corresponding to each different memory slot 108a-108b.

Power connectors 110a-110b provide the power signals to and from the power source enclosed within casing 214. One of the power connectors 110a or 110b servers as an inlet to provide power signals to the power source, while the other power connector 110a-110b serves as an outlet to deliver the power and power signals from the power source. Each power connector 110a-110b may be positioned on a different side of multiple cards 106a-106b such that the sides may oppose one another. In another implementation, power connectors 110a-110 may also be coupled to casing 214.

Figure 3:
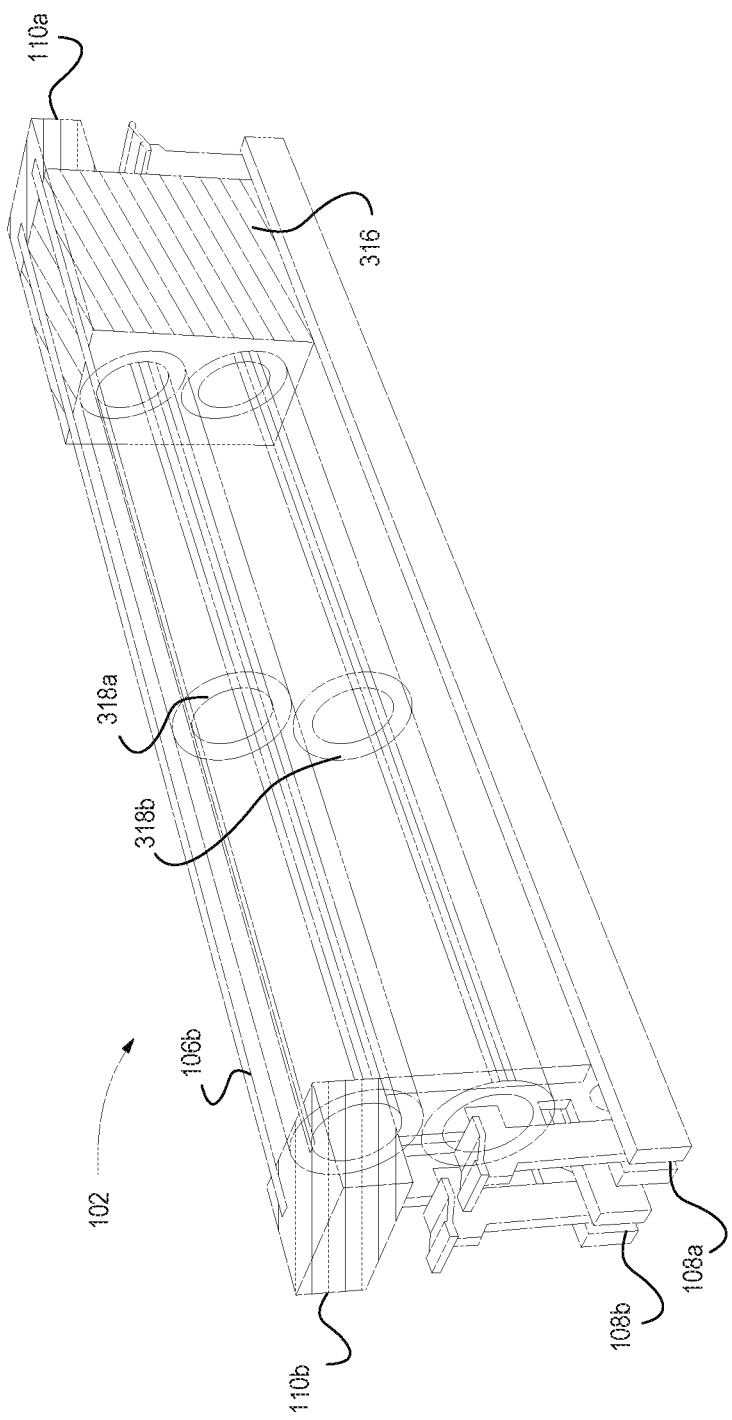
FIG. 3 illustrates an example system including battery modules mounted in between multiple cards and placed in multiple memory cards in accordance with the present disclosure.

FIG. 3 illustrates an internal perspective of a power source within example system 102. The power source comprises converter 316 and battery modules 318a-318b. Converter 316 and battery modules 318a-318b are mounted between cards 106a-106b. As depicted in FIG. 3 card 106a, previously illustrated in FIGS. 1-2 was not illustrated so as to illustrate converter 316 and battery modules 318a-318b. Card 106a would be located on the forefront of the power source. As explained in connection with earlier figures, cards 106a-106b each include an edge which is configured to fit memory slots 108a-108. Additionally, power connectors 110a-110b are coupled to converter 316 and battery modules 318a-318b.

Converter 216 is a device coupled to power connector 110a and battery modules 318a-318b. Converter 216 operates to provide functionalities such as a conversion of electrical energy from one form, changing an amount of power, or combination thereof.

Battery modules 318a-318b are power storage modules which are mounted between cards 106a-106b. Battery modules 318a-318b operate as part of the power source to provide power to the server. As such, battery modules 318a-318b may be considered the primary source of power within the server or may provide additional available power. Although FIG. 3 illustrates two battery modules 318a-318b, implementations should not be so limited as this was done for illustration purposes. For example, the power source may include a single battery module or more than two battery modules.

Figure 4:
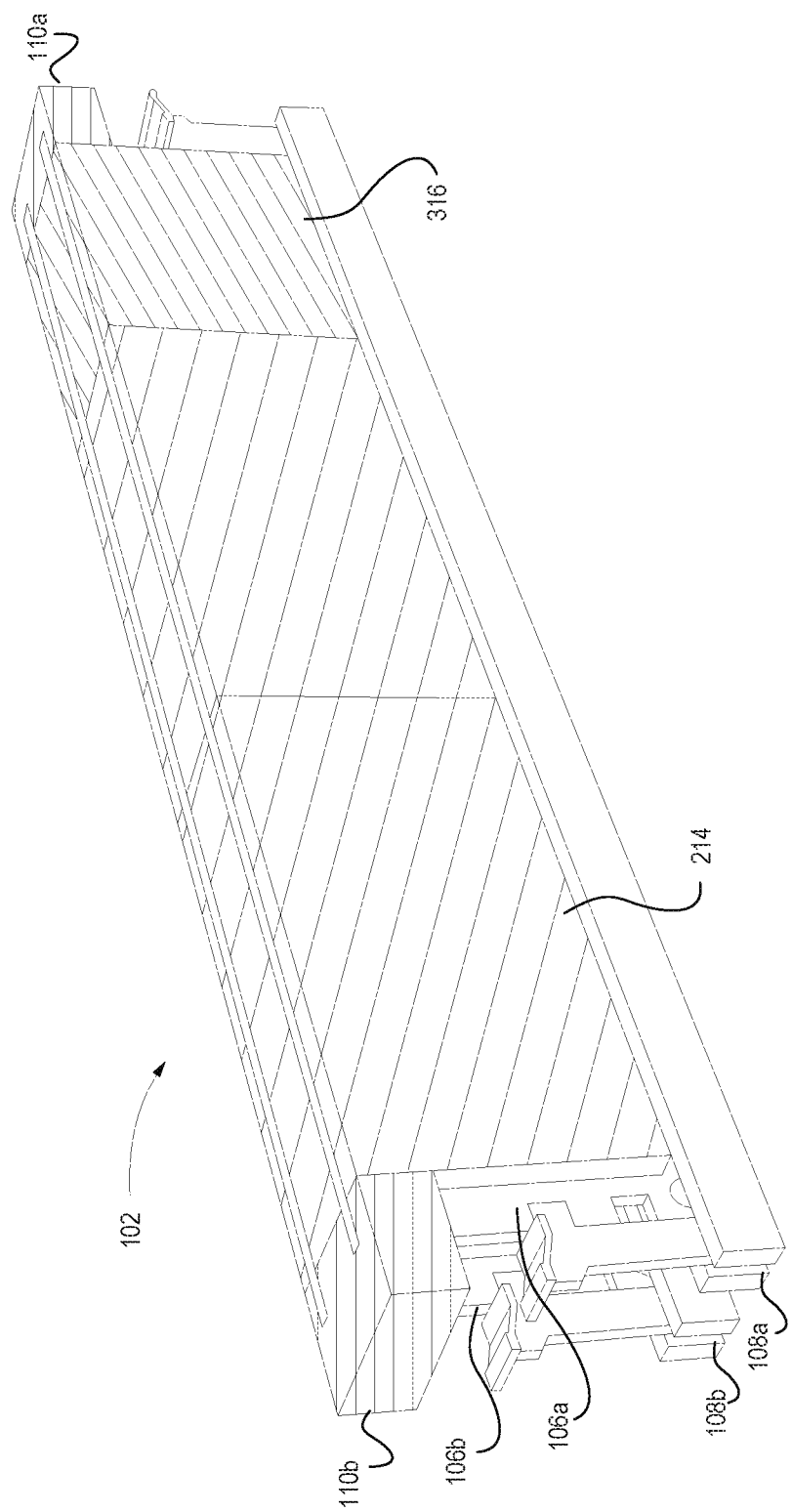
FIG. 4 illustrates an example system including a power source and converter mounted on multiple cards in accordance with the present disclosure.

FIG. 4 illustrates an example system 102 including converter 316 and other components comprising the power source. The power source is mounted on cards 106a-106b and enclosed by casing 214. The power source is internal to casing 214 and includes converter 316 and other electrical components (not illustrated). Cards 106a-106b each include an edge which each fit into corresponding memory slot 108a-108b. Power connectors 110a-110b, as located on opposing sides of the cards 106a-106b from one another, are coupled to the power source internal to casing 214 to deliver power signals to and from the power source. Although FIG. 4 illustrates converter 316 as separate from casing 214, this was done for illustration purposes as casing 214 may also enclose converter 316.

Figure 5:
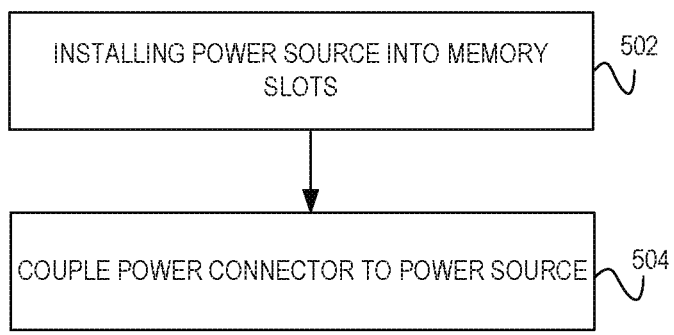
FIG. 5 illustrates an example flow diagram for manufacturing a system including installation of a power source into multiple memory slots and coupling of a power connector to the power source in accordance with the present disclosure.
Figure 6:
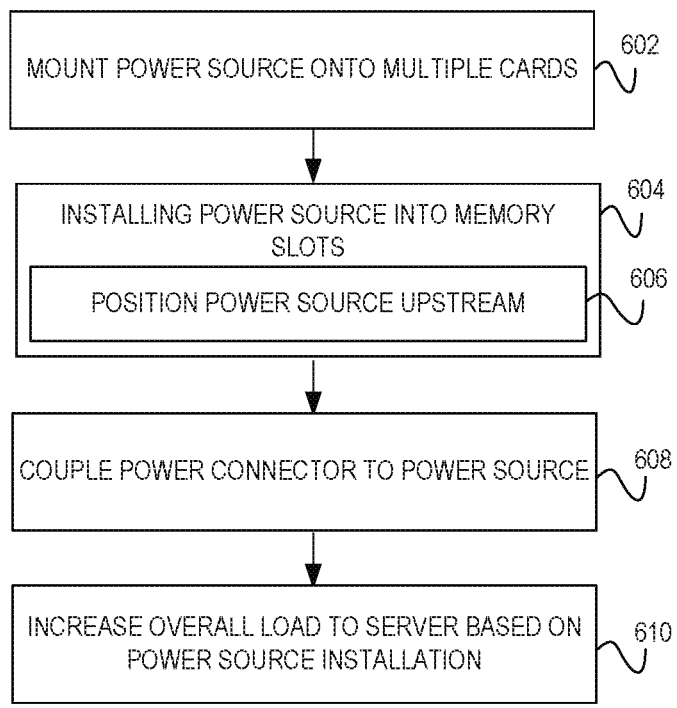
FIG. 6 illustrates an example flow diagram for manufacturing a system including mounting a power source onto multiple cards, installing the power source as mounted on the multiple cards into multiple memory slots, and increasing an overall load to a server based on installation of the power source in accordance with the present disclosure.

Referring now to FIGS. 5 and 6, flow diagrams are illustrated in accordance with various examples of the present disclosure. The flow diagrams represent processes that may be utilized in conjunction with various systems and devices as discussed with reference to the preceding figures. While illustrated in a particular order, the flow diagrams are not intended to be so limited. Rather, it is expressly contemplated that various processes may occur in different orders and/or simultaneously with other processes than those illustrated.

FIG. 5 is a flow diagram illustrating a method of manufacturing a power source for installation into multiple memory slots within a server. The method is initiated at operation 502 by installing the power source into multiple memory slots on a circuit board within a server. Upon installing the power source into the multiple memory slots, the method may proceed to couple a power connector to the power source. The power connector is located on a side of a card, other than an edge of the card. In a more specific implementation, the power connector may be located on the side opposing the edge of the card. In discussing FIG. 5, operations 502-504 may be performed by components in FIGS. 1-4. As such, references may be made to such components for purposes of clarification and not to limit such implementations. For example, the power source 104 may be mounted on multiple cards 106 for installation into multiple memory slots 108 to construct the system.

At operation 502, the method of manufacture is initiated by installing the power source into the multiple memory slots within the server. The power source may be mounted on multiple cards which server to provide the electrical connections from the power connector(s) and the server. Each of the cards includes an edge which is designed such that the edge fits into each memory slot. Fitting the edges of the cards into the memory slots serves as a fastener which mechanically joins the mounted power source to the memory slots.

At operation 504, the method couples the power connector to the power source mounted on the multiple cards. The power connector is coupled to the multiple cards along the side of the cards which opposes the edges. In this implementation, the power connector may be placed on the remaining three sides. In a more specific implementation, the power connector may be placed on the side of the multiple cards which opposes the edges. In this implementation, the power connector is coupled to the side of the card which opposes the side configured to fit into the memory slots. Based on installing the power source mounted on the cards and coupling the power connector, the power source may increase an overall load available for the server.

FIG. 6 illustrates an example flow diagram for manufacturing a system to increase an overall load to a server based on installation of a power source into multiple memory slots. The method is initiated based on mounting the power source on multiple cards. Upon mounting the power source on the multiple cards, the edges of the multiple cards are installed into each of the memory slots. Installing the mounted power source into the memory slots via fitting the edges into the memory slots positions the power source in an upstream of an airflow within the server. Positioning the power source upstream enables more efficient cooling for the power source. Based on installing the power source into the memory slots, a power connector is coupled to the power source which facilitates the power signals to and from the power source to the rest of the server. The power connector is coupled to the power source on one of the sides other than the edges which are configured to fit the memory slots. Based on installing the power source and coupling the connector, an overall load available to the server is increased. In discussing FIG. 6, operations 602-610 may be performed by components in FIGS. 1-4. As such, references may be made to such components for purposes of clarification and not to limit such implementations. For example, the power source 104 may be mounted on multiple cards 106 for installation into multiple memory slots 108 to construct the system.

At operation 602 the method of manufacture is initiated by mounting the power source on the multiple cards. Mounting the power source onto the multiple cards, fastens the power components which comprise the power source to the cards. As such operation 602 may connect the components which make the power source to the cards. This operation may include soldering, providing electrical traces and connections among the cards to and from the components. Based on mounting the power source onto the cards, the method may proceed to install the mounted power source into the memory slots.

At operation 604 the power source as mounted on the cards may be installed into the memory slots within the server. The cards include edges which are configured to fit into the memory slots. Thus, upon mounting the power source to the cards, the edges may be placed into the memory slots. In a further implementation based on mounting the power source to the cards, the power source is positioned upstream in the airflow of the server. Operation 604 may be similar in functionality to operation 502 as in FIG. 5.

At operation 606, the power source is positioned upstream in the airflow within the server.

At operation 608, the power connector is coupled to the power source by placing the power connector along a side of the multiple cards other than the edge. Coupling the power connector to the power source may include providing the electrical connections between the connector and the power source to the rest of the server. In another implementation, the power connector is placed along the side of the cards which opposes the edges. Operation 608 may be similar in functionality to operation 504 as in FIG. 5.

At operation 610 based on installing the power source into the memory slots and coupling the power connector to the power source, the overall load available load is increased. In this implementation, the power source may server as an additional power source to the server to increase the load. Alternatively, this may also include relocating the power source from the rear of the server into the memory slots.

Although certain implementations have been illustrated and described herein, it will be appreciated that a wide variety of alternate and/or equivalent implementations calculated to achieve the same purposes may be substituted for the implementations shown and described without departing from the scope of this disclosure. Those with skill in the art will readily appreciate that implementations may be implemented in a variety of ways. This application is intended to cover adaptions or variations of the implementations discussed herein. Therefore, it is manifestly intended that implementations be limited only by the claims and equivalents thereof.

We claim:

1. A system comprising:
   a power source mounted on multiple cards positioned at an inlet of a server;
   the multiple cards, mounted with the power source, each of the multiple cards including an edge configured to fit into a memory slot and without electrical connections on the edge; and
   multiple power connectors coupled to the power source and located on a side of the multiple cards other than the edge, wherein the multiple power connectors are located on the sides of the multiple cards opposing one another.

2. The system of claim 1 comprising:
   a converter, coupled to the power source, and mounted between the multiple cards.

3. The system of claim 1 wherein the power source comprises a power converter mounted on the multiple cards and coupled to the power connector.

4. The system of claim 1 wherein the power source mounted on the multiple power cards is positioned upstream in an airflow from a rear of the system.

5. The system of claim 1 wherein the power connector coupled to the power source is located on an opposing side from the edge.

6. The system of claim 1 wherein the memory slot is repurposed to support the power source via installation of the multiple cards mounted with the power source without a dual in-line memory module.

7. A power source comprising:
   multiple power cards mounted with multiple battery modules;
   an edge located on the multiple power cards mounted with the multiple power components and configured to fit into multiple memory slots, wherein the edge is without an electrical connection;
   multiple power connectors coupled to the multiple power cards and located along sides of the multiple power cards opposing one another and located on the sides other than the edge; and
   multiple battery modules coupled to the multiple power connectors and mounted between the multiple power cards.

8. The power source of claim 7 comprising:
   a converter mounted to the multiple power cards and coupled to the multiple power connectors.

9. The power source of claim 7 wherein the power source is positioned upstream in an airflow within a server.

10. The power source of claim 7 wherein the power source is purposed to include multiple power components without a dual-in line memory module.

11. The power source of claim 7 wherein the power source is positioned toward an inlet of a server.

12. A method comprising:
    installing a power source into multiple memory slots within a server via coupling multiple edges corresponding to multiple cards mounted with the power source into the multiple memory slots, wherein the multiple edges are without electrical connections; and
    coupling a power connector to the power source via placing the power connector along a side of the multiple cards which opposes that is perpendicularly opposed to the multiple edges; and
    positioning the power source and the coupled power connector towards an inlet of the server.

13. The method of claim 12 comprising:
    mounting the power source on the multiple cards prior to installation of the power source into the multiple memory slots.

14. The method of claim 12 comprising:
    increasing an overall load available to the server upon the installation of the power source into the multiple memory slots.

15. The method of claim 12 wherein positioning the power source and the coupled power connector towards the inlet of the server comprises:
    positioning the power source upstream in an airflow within the server such that the position of the power source is within a central area of the server.

16. The method of claim 12 wherein installing the power source into the multiple memory slots within the server comprises:
    repurposing the multiple memory cards intended for dual in-line memory modules via installation of multiple battery storage modules between the multiple cards.

17. The method of claim 12 wherein the multiple cards are without electrical connections.

* * * * *